(12) United States Patent
Evans et al.

(10) Patent No.: US 6,464,767 B1
(45) Date of Patent: *Oct. 15, 2002

(54) INK JET PRINTING METHOD

(75) Inventors: Steven Evans, Rochester; Helmut Weber, Webster; Ellen M. Pyszczek, LeRoy; Ann L. Carroll-Lee, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 110 days.

This patent is subject to a terminal disclaimer.

(21) Appl. No.: 09/689,200

(22) Filed: Oct. 12, 2000

(51) Int. Cl.$^7$ ................................ C09D 11/02
(52) U.S. Cl. ................ 106/31.5; 106/31.48; 106/31.58; 347/100
(58) Field of Search ............................ 106/31.5, 31.48, 106/31.58; 534/774, 781, 785, 792, 793; 347/100

(56) References Cited

U.S. PATENT DOCUMENTS

| | | | |
|---|---|---|---|
| 4,101,540 A | * 7/1978 | Coispeau | .................... 534/607 |
| 4,685,934 A | 8/1987 | Benguerel et al. | .............. 8/684 |
| 6,136,080 A | * 10/2000 | Evans et al. | ................ 106/31.5 |
| 6,174,356 B1 | * 1/2001 | Evans et al. | ............. 106/31.48 |
| 6,280,026 B1 | * 8/2001 | Lawrence et al. | .......... 347/100 |
| 6,280,027 B1 | * 8/2001 | Lawrence et al. | .......... 347/100 |
| 6,280,028 B1 | * 8/2001 | Lawrence et al. | .......... 347/100 |

* cited by examiner

*Primary Examiner*—Helene Klemanski
(74) *Attorney, Agent, or Firm*—Harold E. Cole

(57) ABSTRACT

An ink jet printing method, comprising the steps of:
  A) providing an ink jet printer that is responsive to digital data signals;
  B) loading said printer with an ink jet recording element comprising a support having thereon an image-receptive layer capable of accepting an ink jet image;
  C) loading said printer with an ink jet ink composition comprising water, a humectant and a water-soluble pyrazoleazoindole dye; and
  D) printing on said ink jet recording element using said ink jet ink in response to said digital data signals.

9 Claims, No Drawings

INK JET PRINTING METHOD

CROSS REFERENCE TO RELATED APPLICATION

Reference is made to commonly assigned, co-pending U.S. patent application Ser. No. 09/689,184 by Evans et al., filed concurrently herewith entitled "Dye For Ink Jet Ink"; the disclosure of which is hereby incorporated by reference.

FIELD OF THE INVENTION

This invention relates to an ink jet printing method using a pyrazoleazoindole dye as a colorant in an ink jet composition.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant, which is dissolved in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature in both cases. Commonly used carrier media include water, mixtures of water and organic co-solvents and high boiling organic solvents, such as hydrocarbons, esters, ketones, etc.

The choice of a colorant in ink jet systems is critical to image quality. For colors such as cyan, magenta, yellow, green, orange, etc., the peak wavelength (λ-max), the width of the absorption curve and the absence of secondary absorptions are important. The colorant should also have a high degree of light fastness after printing onto the ink-receiving element. For aqueous dye-based inks, the dye needs to be sufficiently soluble in water to prepare a solution that is capable of producing adequate density on the receiving element and stable for extended periods of storage without precipitation. High quality ink jet printing with dye-based inks requires dyes which will provide both bright hue and good light stability. It is difficult to find dyes, particularly yellow dyes, which meet all of these requirements.

Aqueous dye-based inks for high-quality, photo-realistic, ink jet printing require water-soluble dyes with excellent color and high light- and water-fastness. Typically the dyes are chosen from acid, direct and reactive dyestuffs developed for the dyeing of natural fibers such as paper, wool and cotton. Water solubility of these dyes is due to the incorporation of negatively charged substituent groups such as sulfo or carboxy.

U.S. Ser. No. 09/306,121, now U.S. Pat. No. 6,174,356 filed May 6, 1999, discloses water-soluble azoindole dyes for use in ink jet printing including dyes derived from diazotizable heteroaromatic amines. However, there is a problem with some of these dyes in that they do not have sufficient light stability.

U.S. Pat. No. 4,685,934 describes water-soluble pyrazoleazoindole yellow and orange dyes useful for conventional dyeing of synthetic fibers and textiles. However, there is no disclosure in this patent for use of these dyes in ink jet printing.

It is an object of this invention to provide an ink jet printing method using bright, readily water-soluble and light stable azoindole dyes derived from diazotizable heteroaromatic amines useful for aqueous ink jet printing.

SUMMARY OF THE INVENTION

This and other objects are achieved in accordance with this invention which relates to an ink jet printing method, comprising the steps of:

A) providing an ink jet printer that is responsive to digital data signals;

B) loading said printer with an ink jet recording element comprising a support having thereon an image-receptive layer capable of accepting an ink jet image;

C) loading said printer with an ink jet ink composition comprising water, a humectant and a water-soluble pyrazoleazoindole dye; and D) printing on said ink jet recording element using said ink jet ink in response to said digital data signals.

DETAILED DESCRIPTION OF THE INVENTION

In a preferred embodiment of the invention, the pyrazoleazoindole dyes employed in the invention may be represented by the following structure:

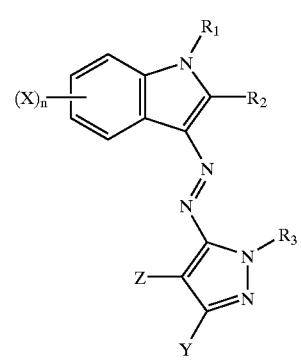

I wherein:

$R_1$ and $R_3$ each independently represents hydrogen, a substituted or unsubstituted alkyl group of 1–6 carbon atoms, a substituted or unsubstituted allyl group, a substituted or unsubstituted aryl group of 6–10 carbon atoms, a substituted or unsubstituted heteroaryl group of 5–10 atoms or a polyoxyalkylene group of 2–20 alkylene oxide residues;

$R_2$, X and Y each independently represents the groups listed above for $R_1$, halogen, cyano, carboxy, acyl, nitro, sulfo, a substituted or unsubstituted alkoxy group of 1–6 carbon atoms, a substituted or unsubstituted aryloxy group of 6–10 carbon atoms, a substituted or unsubstituted alkoxy- or aryloxy-carbonyl group of 1–10 carbon atoms, a polyoxyalkylene group of 2–20 alkylene oxide residues, a ureido group, carbamoyl, a substituted or unsubstituted alkyl-, arylalkyl-, aryl-, diaryl- or dialkyl-carbamoyl group of 1–20 carbon atoms, sulfamoyl, a substituted or unsubstituted alkyl-, arylalkyl-, aryl-, diaryl- or dialkyl-sulfamoyl group of 1–20 carbon atoms, acylamino, sulfonylamino, amino, or a substituted or unsubstituted alkyl-, aralkyl-, aryl-, diaryl- or dialkyl-amino group of 1–20 carbon atoms;

n represents an integer from 1–4; and

Z represents cyano, carboxy, sulfo, alkoxycarbonyl, carbamoyl or a substituted or unsubstituted alkyl-, arylalkyl-, aryl-, diaryl- or dialkyl-carbamoyl group of 1–20 carbon atoms;

with the proviso that the dye must contain at least one group capable of imparting water solubility at a pH of about 4–9.

In a preferred embodiment of the invention, $R_1$ in the above formula represents hydrogen, methyl or 2-carboxyethyl. In another preferred embodiment, $R_2$ represents methyl or phenyl. In still another preferred embodiment, X represents hydrogen, sulfo, a substituted 1,3,5-triazinylamino group or an N-alkylphthalamido group. In yet another preferred embodiment, $R_3$ represents 4-sulfophenyl, 2,5-bis-sulfophenyl, methyl, phenyl, 4-carboxyphenyl or 3-sulfopropyl. In yet another preferred embodiment, Y represents hydrogen. In still yet another preferred embodiment Z represents cyano, carboxy or carbamoyl.

In the above definition, examples of a substituted or unsubstituted alkyl group include methyl, ethyl, isopropyl, hydroxyethyl, 3-sulfopropyl and m-carboxybenzyl. Examples of a substituted or unsubstituted aryl group include phenyl, naphthyl, 3,5-biscarboxyphenyl and 4-sulfophenyl. Examples of a substituted or unsubstituted heteroaryl group include pyridyl, imidazolyl and quinolyl. Examples of halogen include chloro, fluoro, bromo and iodo. Examples of an acyl group include acetyl and 4-sulfobenzoyl. Examples of a substituted or unsubstituted alkoxy group include methoxy, 3-carboxypropoxy and 2-hydroxyethoxy. Examples of a substituted or unsubstituted aryloxy group include phenoxy, 3-carboxyphenoxy and 4-sulfophenoxy. Examples of a substituted or unsubstituted alkoxy- or aryloxy-carbonyl group of 1–10 carbon atoms include methoxycarbonyl, ethoxycarbonyl, 2-methoxyethoxycarbonyl and 3-sulfophenoxycarbonyl. Examples of a substituted or unsubstituted alkyl- aralkyl-, aryl-, diaryl-or dialkyl carbamoyl group include N-methylcarbamoyl, N-methyl-N-4-sulfophenyl-carbamoyl, N,N-bis(4-carboxyphenyl)carbamoyl. Examples of a substituted or unsubstituted alkyl- aralkyl-, aryl-, diaryl- or dialkyl sulfamoyl group include N-methylsulfamoyl, N-methyl-N-phenyl-sulfamoyl, N-(p-sulfophenyl)sulfamoyl and N,N-bis(4-carboxyphenyl)sulfamoyl. Examples of an acylamino group include acetamido, methoxyethylacetamido and 3-carboxybenzamido. Examples of a ureido group include N-methylureido, ureido and N,N'-dimethylureido. Examples of a sulfonylamino group include methanesulfonamido, p-toluenesulfonamido and 2-sulfatoethanesulfonamido. Examples of a substituted or unsubstituted alkyl- aralkyl-, aryl- diaryl- or dialkylamino group include methylamino, N,N-dimethylamino, methoxyethylamino and 3-sulfoanilino.

Examples of groups capable of imparting water solubility at a pH of about 4–9 include sulfonic, sulfinic, phosphonic, phosphoric and carboxylic acid moieties and salts thereof; primary, secondary and tertiary amino groups; and quaternary ammonium or phosphonium groups.

The dyes employed in the invention are not new and may be prepared by the methods disclosed in the above references or in Dyes and Pigments, Vol 2, pp. 305–318 (1981).

Representative examples of the pyrazoleazoindole dyes employed in this invention are listed below.

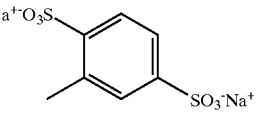

| Dye | $R_1$ | $R_2$ | $R_3$ | X | Z |
|---|---|---|---|---|---|
| 1 | $C_2H_4CO_2H$ | $C_6H_5$ | $CH_3$ | H | CN |
| 2 | H | $C_6H_5$ | H | $SO_3^-Na^+$ | CN |
| 3 | $C_2H_4CO_2H$ | $C_6H_5$ | H | H | CN |
| 4 | $C_2H_4CO_2H$ | $CH_3$ | $CH_3$ | H | CN |
| 5 | $CH_2CO_2H$ | $CH_3$ | $CH_3$ | H | CN |
| 6 | $CH_3$ | $CH_3$ | 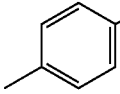 | H | CN |
| 7 | $C_2H_4CO_2H$ | $CH_3$ |  | H | CN |

-continued
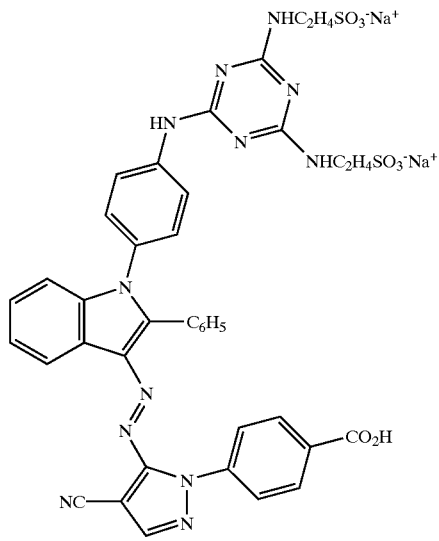
| Dye | R₁ | R₂ | R₃ | X | Z |
|---|---|---|---|---|---|
| 8 | $C_2H_4CO_2H$ | $CH_3$ | 4-($CO_2H$)-phenyl | H | CN |
| 9 | H | $CH_3$ | 2-methyl-3,6-di($SO_3^-Na^+$)-phenyl | H | CN |
| 10 | $CH_3$ | $CH_3$ | 4-($SO_3^-Na^+$)-phenyl | $SO_3^-Na^+$ | $CONH_2$ |
| 11 | $C_2H_4CO_2H$ | $CH_3$ | 4-($SO_3^-Na^+$)-phenyl | H | $CO_2H$ |
Other dyes employed in this invention include:
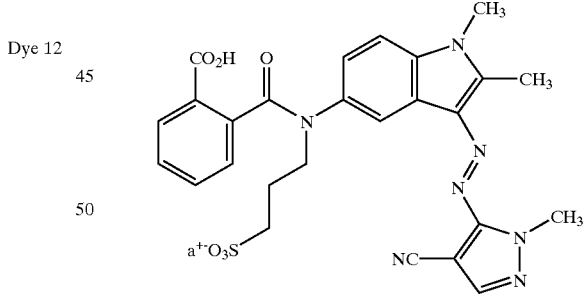
Dye 12
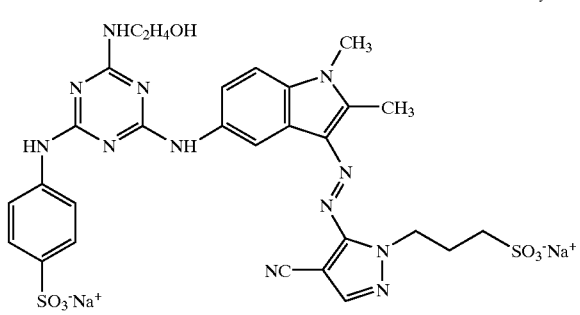
Dye 13
Dye 14

-continued

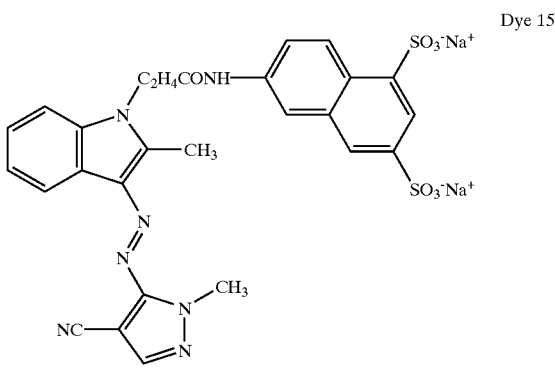

Dye 15

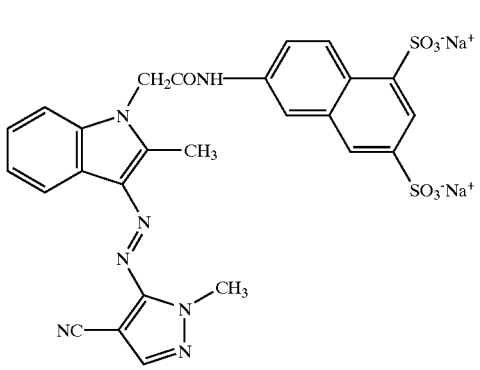

Dye 16

In general, the above dyes comprise from about 0.2 to about 8%, preferably from about 1 to about 5% by weight of the ink jet ink composition.

A humectant is employed in the ink jet composition employed in the invention to help prevent the ink from drying out or crusting in the orifices of the printhead. Examples of humectants which can be used include polyhydric alcohols, such as ethylene glycol, diethylene glycol, triethylene glycol, propylene glycol, tetraethylene glycol, polyethylene glycol, glycerol, 2-methyl-2,4-pentanediol, 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, and diethylene glycol monobutylether; nitrogen-containing cyclic compounds, such as pyrrolidone, N-methyl-2-pyrrolidone, and 1,3-dimethyl-2-imidazolidinone; and sulfur-containing compounds such as dimethyl sulfoxide and tetramethylene sulfone. A preferred humectant for the composition employed in the invention is diethylene glycol, glycerol, or diethylene glycol monobutylether.

Water-miscible organic solvents may also be added to the aqueous ink employed in the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

Surfactants may be added to adjust the surface tension of the ink to an appropriate level. The surfactants may be anionic, cationic, amphoteric or nonionic.

A biocide may be added to the composition employed in the invention to suppress the growth of micro-organisms such as molds, fungi, etc. in aqueous inks. A preferred biocide for the ink composition of the present invention is Proxel® GXL (Zeneca Specialties Co.) at a final concentration of 0.0001–0.5 wt. %.

The pH of the aqueous ink compositions employed in the invention may be adjusted by the addition of organic or inorganic acids or bases. Useful inks may have a preferred pH of from about 2 to 10, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

A typical ink composition employed in the invention may comprise, for example, the following constituents by weight: colorant (0.2–8%), water (20–95%), a humectant (5–70%), water miscible co-solvents (2–20%), surfactant (0.1–10%), biocide (0.05–5%) and pH control agents (0.1–10%).

Additional additives which may optionally be present in the ink jet ink composition employed in the invention include thickeners, conductivity enhancing agents, anti-kogation agents, drying agents, and defoamers.

In the ink jet printing method of the invention, liquid ink drops are applied in a controlled fashion to an ink receptive layer substrate, by ejecting ink droplets from a plurality of nozzles or orifices of the print head of an ink jet printer.

Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

The following examples illustrate the utility of the present invention.

EXAMPLES

The following control dyes were evaluated as comparative examples:

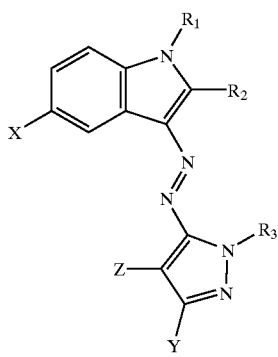

| Dye | R₁ | R₂ | R₃ | X | Y | Z |
|---|---|---|---|---|---|---|
| C-1 | H | C$_6$H$_5$ | C$_6$H$_5$ | SO$_3^-$Na$^+$ | CH$_3$ | H |
| C-2 | H | CH$_3$ | -C$_6$H$_4$-SO$_3^-$Na$^+$ (p-tolyl) | H | C$_6$H$_5$ | H |
| C-3 | C$_2$H$_4$CO$_2$H | C$_6$H$_5$ | -C$_6$H$_4$-SO$_3^-$Na$^+$ (p-tolyl) | H | C$_6$H$_5$ | H |

Preparation of Inks

Inks containing the dyes employed in the invention and control dyes were prepared by dissolving an appropriate amount of the dye in deionized water containing humectants of diethylene glycol and glycerol, each at 6 wt. %, a biocide, Proxel GXL® at 0.003 wt. % and a surfactant, Surfynol 465® (Air Products Co.) at 0.5 wt. %. The pH of each ink was adjusted to approximately 8 by adding triethanolamine. The dye concentrations were based on solution absorption spectra and chosen such that the final ink, when diluted 1:1000, would yield a transmission optical density of approximately 1.0. Details are given in the Table below.

TABLE 1

| Ink | Dye | Wt. % Dye |
|---|---|---|
| 1 | 1 | 1.83 |
| 2 | 2 | 2.9 |
| 3 | 3 | 2.12 |
| 4 | 4 | 1.39 |
| 5 | 5 | 1.32 |
| 6 | 6 | 2.53 |
| 7 | 7 | 1.95 |
| 8 | 8 | 1.68 |
| 9 | 9 | 2.56 |
| 10 | 10 | 3.43 |
| 11 | 11 | 2.16 |
| 12 | 12 | 3.45 |
| 13 | 13 | 3.66 |
| 14 | 14 | 4.19 |
| 15 | 15 | 3.67 |
| 16 | 16 | 3.37 |
| C-1 | C-1 | 2.9 |
| C-2 | C-2 | 2.14 |
| C-3 | C-3 | 2.58 |

Printing of Test Images

The above inks were then filtered through a 0.45µ polytetrafluoroethylene filter and placed in a clean Hewlett-Packard ink cartridge No. HP 51629A and fitted into the black ink station of a Hewlett-Packard DeskJet 600® printer. A test image consisting of a series of 21 variable density patches, approximately 15 by 13 mm in size, ranging from 5% dot coverage to 100% dot coverage was printed onto commercially-available Kodak Premium Picture Paper for Inkjet, Catalog No. 824-5276, and allowed to dry for 24 hours at ambient temperature and humidity.

Evaluation of Test Images

The printed images were bright yellow to yellow-orange in color. The Status A blue reflection densities of the maximum density patch (Blue D-max) of the above stepped images were measured using an X-Rite® 820 densitometer and are listed in the Table below. Values greater than about 1.3 are acceptable.

The stepped images were then subjected to light fade under 50 Klux high-intensity daylight irradiation and 50% relative humidity conditions for 2 weeks. The Status A blue densities of the stepped images were remeasured and the % Status A blue density loss for the 75% dot coverage patches were calculated. Smaller % loss numbers represent more stable dyes and are preferred.

TABLE 2

| Ink | Blue D-max | % Loss Light Fade |
|---|---|---|
| 1 | 1.79 | 0 |
| 2 | 1.75 | 24 |
| 3 | 1.5 | 35 |
| 4 | 1.81 | 0 |
| 5 | 1.88 | 0 |
| 6 | 2.01 | 10 |
| 7 | 1.87 | 7 |
| 8 | 1.75 | 10 |
| 9 | 1.53 | 0 |
| 10 | 1.77 | 28 |
| 11 | 1.41 | 42 |
| 12 | 1.38 | 11 |

TABLE 2-continued

| Ink | Blue D-max | % Loss Light Fade |
|---|---|---|
| 13 | 1.86 | 15 |
| 14 | 1.59 | 14 |
| 15 | 2.0 | 22 |
| 16 | 1.73 | 25 |
| C-1 | 1.83 | 73 |
| C-2 | 1.42 | 84 |
| C-3 | 1.6 | 82 |

The above data shows that inks containing the dyes employed in the invention yield more light stable images than closely related analogs. The printed images are also bright and of high density.

The invention has been described in detail with particular reference to certain preferred embodiments thereof, but it will be understood that variations and modifications can be effected within the spirit and scope of the invention.

What is claimed is:

1. An ink jet printing method, comprising the steps of:
A) providing an ink jet printer that is responsive to digital data signals;
B) loading said printer with an ink jet recording element comprising a support having thereon an image-receptive layer capable of accepting an ink jet image;
C) loading said printer with an ink jet ink composition comprising water, a humectant and a water-soluble pyrazoleazoindole dye; and
D) printing on said ink jet recording element using said ink jet ink in response to said digital data signals;
wherein said water-soluble pyrazoleazoindole dye may be represented by the following structure:

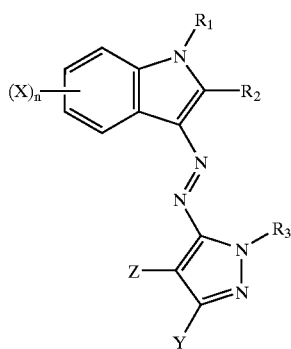

I wherein:

$R_1$ and $R_3$ each independently represents hydrogen, a substituted or unsubstituted alkyl group of 1–6 carbon atoms, a substituted or unsubstituted allyl group, a substituted or unsubstituted aryl group of 6–10 carbon atoms, a substituted or unsubstituted heteroaryl group of 5–10 atoms or a polyoxyalkylene group of 2–20 alkylene oxide residues;

$R_2$, X and Y each independently represents the groups listed above for $R_1$, halogen, cyano, carboxy, acyl, nitro, sulfo, a substituted or unsubstituted alkoxy group of 1–6 carbon atoms, a substituted or unsubstituted aryloxy group of 6–10 carbon atoms, a substituted or unsubstituted alkoxy- or aryloxy-carbonyl group of 1–10 carbon atoms, a polyoxyalkylene group of 2–20 alkylene oxide residues, a ureido group, carbamoyl, a substituted or unsubstituted alkyl-, arylalkyl-, aryl-, diaryl- or dialkyl-carbamoyl group of 1–20 carbon atoms, sulfamoyl, a substituted or unsubstituted alkyl-, arylalkyl-, aryl-, diaryl- or dialkyl-sulfamoyl group of 1–20 carbon atoms, acylamino, sulfonylamino, amino, or a substituted or unsubstituted alkyl-, aralkyl-, aryl-, diaryl- or dialkyl-amino group of 1–20 carbon atoms;

n represents an integer from 1–4; and

Z represents cyano, carboxy, sulfo, alkoxycarbonyl, carbamoyl or a substituted or unsubstituted alkyl-, arylalkyl-, aryl-, diaryl- or dialkyl-carbamoyl group of 1–20 carbon atoms;

with the proviso that the dye must contain at least one group capable of imparting water solubility at a pH of about 4–9.

2. The method of claim 1 wherein $R_1$ represents hydrogen, methyl or 2-carboxyethyl.

3. The method of claim 1 wherein $R_2$ represents methyl or phenyl.

4. The method of claim 1 wherein X represents hydrogen, sulfo, a substituted 1,3,5-triazinylamino group or an N-alkylphthalamido group.

5. The method of claim 1 wherein $R_3$ represents 4-sulfophenyl, 2,5-bis-sulfophenyl, methyl, phenyl, 4-carboxyphenyl or 3-sulfopropyl.

6. The method of claim 1 wherein Y represents hydrogen.

7. The method of claim 1 wherein Z represents cyano, carboxy or carbamoyl.

8. The method of claim 1 wherein said humectant is diethylene glycol, glycerol or diethylene glycol monobutylether.

9. The method of claim 1 wherein said dye comprises about 0.2 to about 8% by weight of said inkjet ink composition.

* * * * *